T. J. FAY.
SYSTEM FOR SUPPLYING LIQUID FUEL.
APPLICATION FILED AUG. 25, 1915.
1,276,890.
Patented Aug. 27, 1918.
3 SHEETS—SHEET 1.
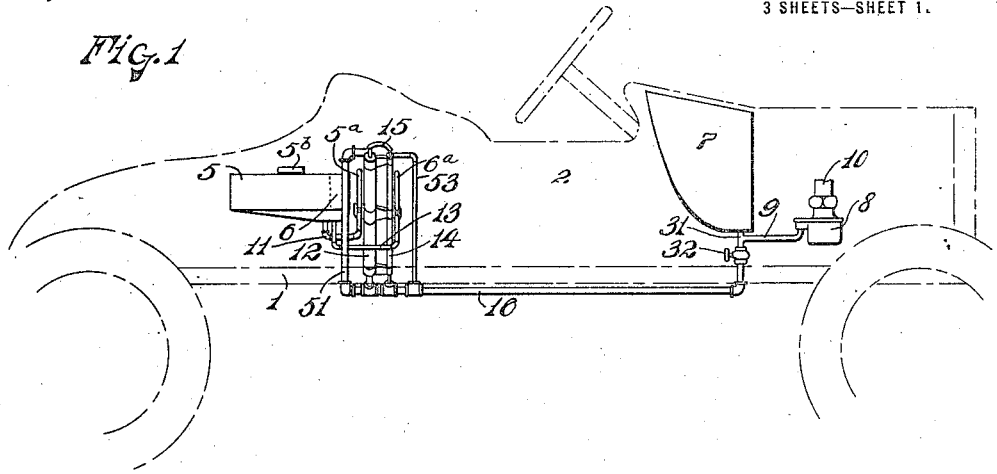
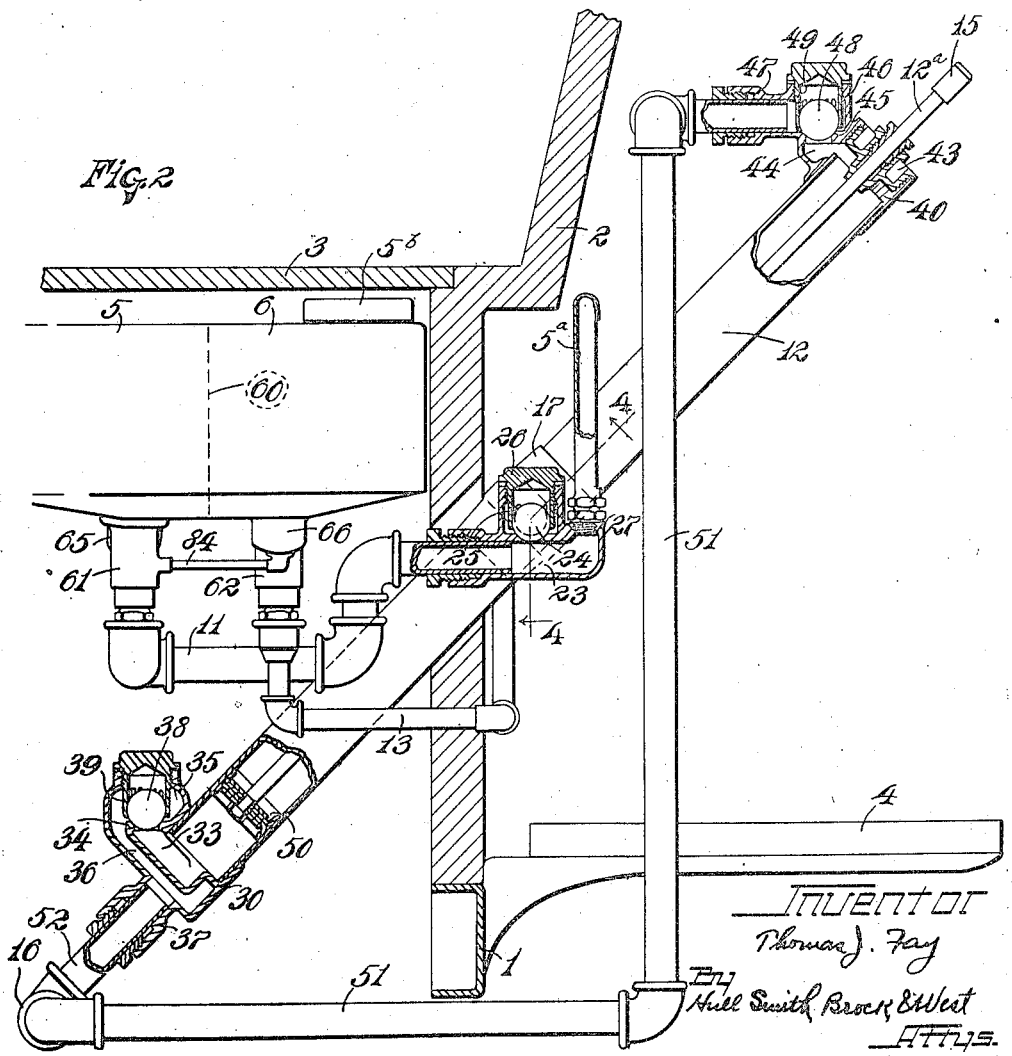

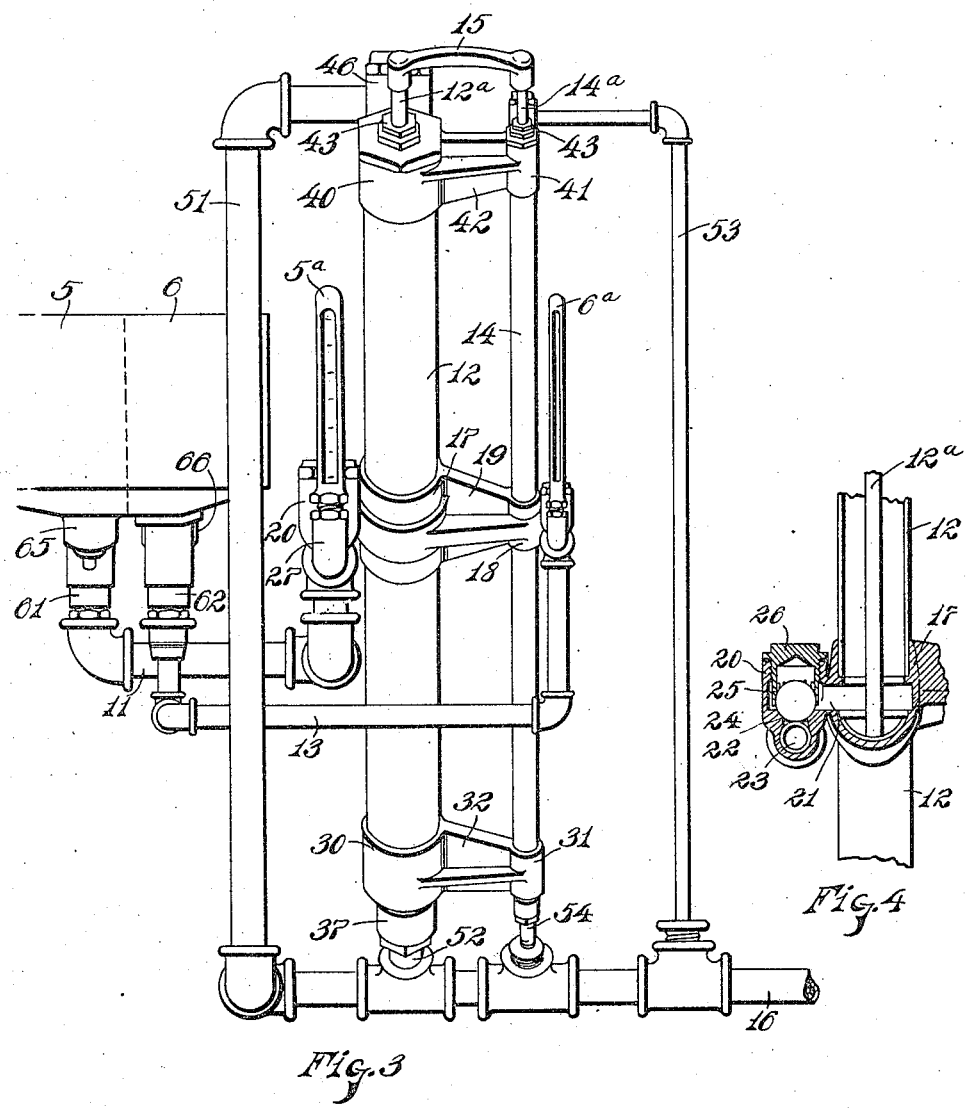

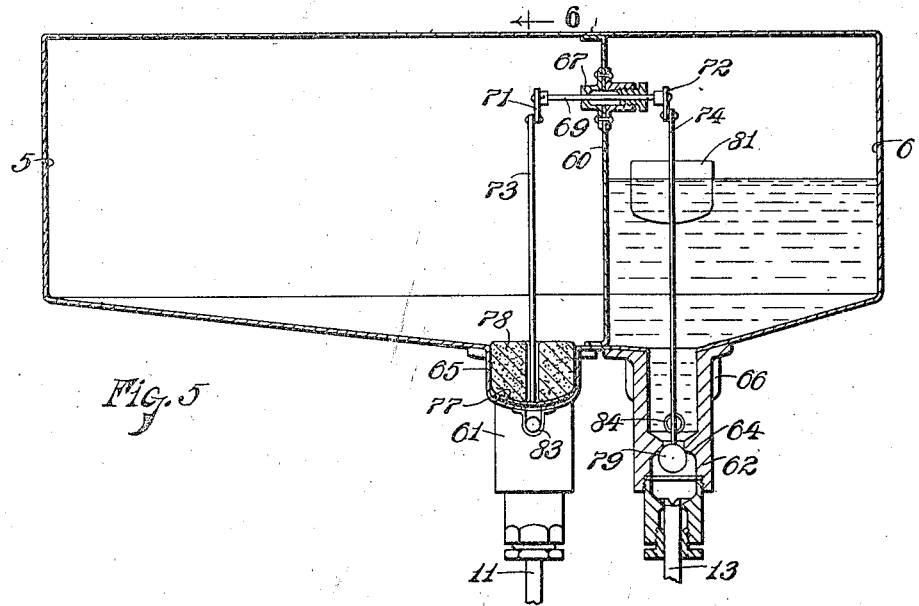
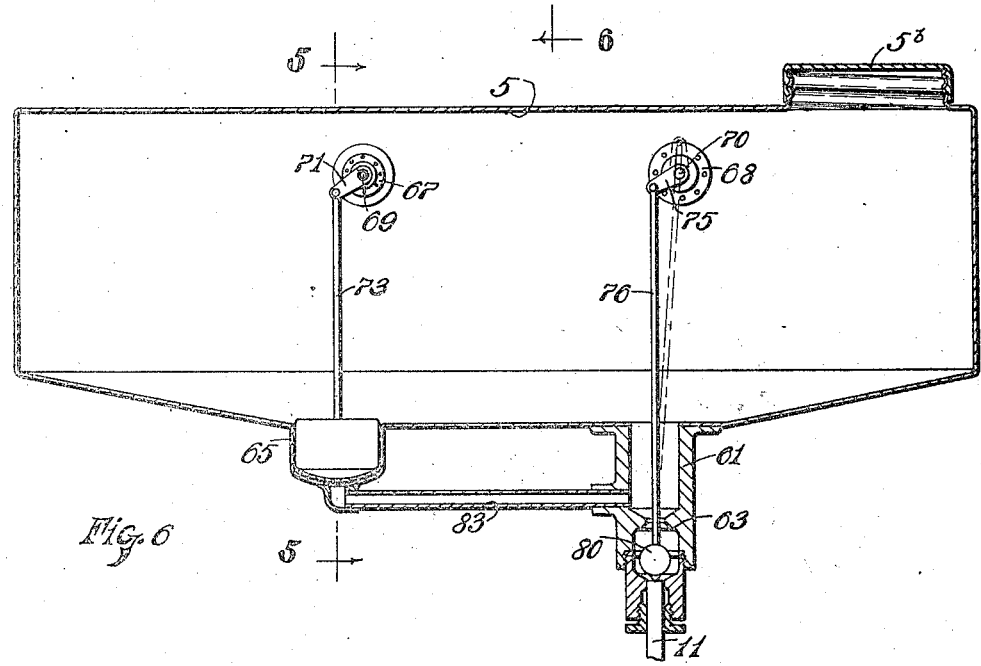

UNITED STATES PATENT OFFICE.

THOMAS J. FAY, OF BROOKLYN, NEW YORK, ASSIGNOR, BY MESNE ASSIGNMENTS, TO THE STANDARD PARTS COMPANY, OF CLEVELAND, OHIO, A CORPORATION OF OHIO.

SYSTEM FOR SUPPLYING LIQUID FUEL.

1,276,890.   Specification of Letters Patent.   Patented Aug. 27, 1918.

Application filed August 25, 1915. Serial No. 47,380.

*To all whom it may concern:*

Be it known that I, THOMAS J. FAY, a citizen of the United States, residing at Brooklyn, in the county of Kings and State of New York, have invented a certain new and useful Improvement in Systems for Supplying Liquid Fuel, of which the following is a full, clear, and exact description, reference being had to the accompanying drawings.

This invention relates to systems for supplying internal combustion engines with fuel. The objects of the invention are the provision of a system whereby two different hydrocarbons may be conveniently mixed in definite proportions and be supplied in such proportions to the engine cylinder or cylinders, both of which hydrocarbons may be fuel of different grades or one of which may be a fuel and the other a lubricant; the provision of means for shutting off the supply of both liquids upon the exhaustion of either; the provision of an installation of this nature for motor vehicles which is extremely convenient of operation and maintenance; while further objects of the invention will appear hereinafter.

For purposes of illustration but not of limitation I have illustrated one of the many possible embodiments of my invention in the drawings accompanying and forming part of this application, wherein: Figure 1 is a diagrammatic side elevation of a portion of an automobile having my system applied thereto; the two auxiliary storage tanks being shown as separated and spaced apart for convenience of illustration. Fig. 2 is an enlarged detail, partly in section and partly in elevation, of the system, part of the automobile frame and body being shown in transverse section; Fig. 3 represents an elevation of the part of the system illustrated in Fig. 2, the parts of the automobile being omitted for clearness of illustration; Fig. 4 is a sectional detail corresponding to the line 4—4 of Fig. 2; and Figs. 5 and 6 are sectional views taken through auxiliary storage tanks upon the dotted lines indicated.

Describing by reference characters the various parts illustrated herein, 1 denotes the side frame, 2 the body, 3 the seat bottom and 4 the running board of an automobile of ordinary or standard construction. 5 and 6 denote the storage tanks which may be conveniently located close to one of the side frames and rearwardly of the seat, the two being here shown as located closely adjacent to each other, 5 representing the main fuel tank and 6 a tank for a modifying hydrocarbon, as ether, alcohol, or lubricating oil. These tanks are of definite capacity and are preferably provided with gages $5^a$ and $6^a$ respectively whereby the operator may determine by inspection the quantity of liquid in each.

It is intended that the liquid within the tanks 5 and 6 shall be mixed and supplied in definite proportions to a tank 7, located at any suitable point in the car and arranged to deliver directly to the point of use; I have here shown it as separate from the carbureter and located behind the engine and in front of the dash. The tank illustrated supplies a carbureter 8 through a suitable connection 9, and from the carbureter there extends the supply pipe 10 through which the mixture is fed to the engine (not shown). The float chamber of the carbureter itself constitutes a tank within the purview of my invention, though this may be supplemented or not as convenience or necessity demands; however the common tank, if used, ought not to be too large since the mixing of an undue quantity of the substances at one time may entail deterioration or evaporation of the lighter constituent.

The storage tanks are provided with the usual filling openings covered with removable caps, the cap for the tank 5 being indicated at $5^b$. The tank 5 communicates by means of a pipe 11 with a pump 12, while the tank 6 communicates by means of the pipe 13 with a pump 14, said pumps being arranged to be operated simultaneously with equal strokes as by having their piston rods $12^a$ and $14^a$ secured to the same handle 15, and having their discharge ends connected to the same conduit 16 whereby the liquid displaced thereby is delivered to the tank 7. These pumps are conveniently located side by side and are here shown as adapted for manual operation by being mounted in an inclined position outside of the automobile body but inside of the running board as illustrated in Figs. 1 and 2. However I do not confine myself either to this location or to this method of mounting, or even to manual operation. In the embodiment here illustrated I provide twin sleeves 17—18 connected by a web 19, the pump 12 consisting of two separate barrels inserted in opposite ends of the sleeve 17, and the pump 14 consisting of two separate barrels inserted in opposite ends of the sleeve 18. (See Fig. 4). The sleeve 17 is formed at one side with a hollow boss 20 communicating with the interior of the pump by means of a bore 21 and having a circular seat 22 in its lower portion communicating with a chamber 23 which receives the pipe 11. A ball valve 24 rests on this seat and normally closes the same, being guided in its movements by a suitable cage 25 carried by the cover 26. I have shown the forward end of the chamber 23 as provided with an extension 27 which carries the fluid gage 5ª, thus supporting the same at a convenient point for observation.

I have shown the lower ends of the pump barrels as received in twin couplings 30—31 connected by a web 32. The interior of the coupling 30 communicates by means of a passageway 33 with a valve seat 34 formed at the bottom of a hollow boss 35 which in turn communicates by means of the passageway 36 with a coupling 37. The valve seat 34 is shown as governed by a ball valve 38 guided in a cage 39 in the same manner as before.

The upper ends of the pump barrels are shown as received in twin couplings 40—41 connected by the web 42 and formed with stuffing boxes 43—43 for the passage of the piston rods 12ª and 14ª. The interior of the coupling 40 communicates by means of a passage 44 with a valve seat 45 formed at the bottom of a hollow boss 46 which in turn communicates with the coupling 47. In the present embodiment this valve seat is shown as governed by a ball valve 48 guided by the cage 49 as before. The piston rod 12ª is provided with a suitable piston 50, while the couplings 37 and 47 are connected to the pipe 16 by means of the pipes 51 and 52, respectively. The construction of the pump 14 is preferably similar in all respects to that of the pump 12, and its ends are connected to the same pipe 16 by means of the pipes 53 and 54, respectively. However the cross sectional areas of the pumps bear the same relation to each other as the desired proportions of the fluids, and it will be evident that by operating the pumps a mixture of the two fluids in definite proportions will be supplied to the tank 7, and from that tank to the engine.

While gages of any suitable or desired type could be employed, the gages here illustrated consist of vertical glass gage tubes having their zero graduations substantially level with the bottom of the tanks, and preferably graduated in terms of volume by means of fixed or movable graduations so as to be useful for measuring purposes.

It is desirable that pumping should stop when all of either fluid has been exhausted, since otherwise the failure of the one tank might cause injury to the engine, and similarly a failure of the other tank might cause the tank 7 to become filled only with an incombustible substance. I have accordingly provided an arrangement illustrative in Figs. 5 and 6 hereof so that upon the exhaustion of either fluid the passage of the other fluid to the pump will be interrupted.

In these views I have illustrated the two tanks as contained in the same casing but separated from each other by the partition 60, the bottoms of the tanks being provided with outlet connections 61 and 62, respectively, formed at their lower ends for the reception of the pipes 11 and 13, respectively, and formed between their ends with internal valve seats 63 and 64, respectively. Upon the opposite side of the partition 60 from each of these connections the bottom of the other tank is formed with a depression 65—66, while above these connections the partition 60 is pierced by horizontal journal bearings 67 and 68 receiving the rock shafts 69 and 70, leakage being prevented by means of suitable stuffing boxes. The ends of the shaft 69 are provided with crank arms 71 and 72, the former carrying a vertical rod 73 depending into the depression 65, and the latter carrying a rod 74 depending into the connection 62. Likewise the shaft 70 is provided with arms one of which is shown at 75 and carries the rod 76 depending into the connection 61. The lower end of the rod 73 is provided with a stop 77 and upon this rod is loosely sleeved the float 78 whose size is such as to permit it to settle into the depression 65, upon the emptying of the tank 5, carrying with it the rod 73 and rotating the shaft 69. The lower end of the rod 74 carries the valve member 79 adapted upon such rotation of the shaft to be raised against the seat 64 and so cut off the flow through the tube 13. Preferably the relation of the arms 71 and 72 is such that upon the arrival of the float 78 at this lowest position the arm 72 will be moved nearly or quite vertical so that the valve 79 may not be displaced by the suction of the pump.

The rod 76 is likewise provided at its lower end with a valve 80, while the similar rod articulated to the other end of the shaft 70 (but not shown) carries the float 81 adapted upon the exhaustion of liquid in the tank 6 to settle into the depression 66 and move the valve 80 to its seat 63 in the same manner as before. The employment of depressions of a size closely to receive the floats enables the liquid to be drawn thoroughly from each tank, and also induces a rapid closing of the valves at the moment of emptying of the tanks rather than a slow closing movement taking place during the entire pumping operation. The bottoms of the depressions 65 and 66 are connected by the pipes 83 and 84, respectively, with their corresponding outlet connections 61, 62 so that drainage of the same may be complete.

The employment of a gage in connection with each of the receiving tanks permits the operator to check the amount of each liquid delivered to him, after which by operating the pump proportionate quantities of the same are delivered to the tank 7, as needed. The employment of a mixture of fuel and lubricating oil in the definite proportions delivered by this mechanism is advantageous in connection with engines of the sliding sleeve valve type; and the employment of two dissimilar fuels, such as kerosene and ether, is advantageous with all kinds of engines since the mixture can be made up fresh as needed and can be used before the lighter constituent can evaporate. This is not the case when a whole tank full is mixed at one time.

While I have shown an illustrative embodiment of my invention I do not propose to be limited to the details herein described except as the same may be positively included in the claims hereto annexed or may be rendered necessary by the prior state of the art.

Having thus described my invention, what I claim is:—

1. In a system of the character described, the combination, with an engine fuel supply pipe and a liquid fuel tank connected thereto, of a pair of storage tanks, a pair of pumps each of which has an inlet communicating with one of said storage tanks and an outlet communicating with the first mentioned tank.

2. In a system of the character described, the combination, with an engine fuel supply pipe and a liquid fuel tank connected thereto, of a pair of storage tanks for dissimilar liquids, and means for supplying liquids from the two storage tanks in definite and invariable proportions to the first mentioned tank.

3. In a system of the character described, the combination, with an engine fuel supply pipe and a tank, connected therewith, of a pair of storage tanks, a pair of pump barrels, each having an inlet communicating with one of said tanks and arranged substantially parallel with each other, a plunger in each barrel, said barrels differing in cross sectional area, means connecting said plungers whereby they may coöperate in unison, and a connection between the outlets of both pump barrels and the first mentioned tank.

4. In a system of the character described, in combination, a receiving tank, a pair of storage tanks, a pair of pump barrels, each having an inlet communicating with one of said tanks and arranged substantially parallel with each other, a plunger in each barrel, means connecting said plungers whereby they may coöperate in unison, and connections between said pump barrels and the first mentioned tank.

5. The combination with an engine fuel supply pipe, of a tank communicating therewith, a pair of storage tanks for dissimilar liquids, a pump communicating with each of the last mentioned tanks, and means for operating said pumps in unison, said pumps differing in capacity, and a discharge pipe connecting each pump to the first mentioned tank.

6. In a device of the character described, a carbureter, a pair of storage tanks, a pump communicating with each of the last mentioned tanks, and means for operating said pumps simultaneously, said pumps differing in capacity, and connections extending from said pumps to said carbureter.

7. The combination, with an engine fuel supply pipe and a tank communicating therewith, of a pair of storage tanks for dissimilar liquids, and means for simultaneously transferring the respective liquids in predetermined proportions to said first tank in an intermittent manner.

8. The combination, with an engine fuel supply pipe and a tank communicating therewith, of a pair of storage tanks, a pair of pump barrels or cylinders differing in cross sectional area and communicating one with each of said storage tanks, a plunger in each barrel or cylinder, means connecting said plungers whereby they may be operated in unison, each of said cylinders or barrels being provided with a valve-controlled outlet at each end thereof and connections between said outlets and the first mentioned tank.

9. The combination, with an engine fuel supply pipe and a tank communicating therewith, of a pair of storage tanks for dissimilar liquids, a pair of pumps of differing capacity and communicating each with one of the last mentioned tanks, a common mixing pipe extending from said pumps to the first mentioned tank, and means for operating said pumps simultaneously.

10. The combination, with an engine fuel supply pipe and a tank communicating therewith, of a pair of liquid tanks, a pair of pumps communicating each with one of the last mentioned tanks, connections extending from said pumps to the first mentioned tank, and means for operating said pumps to supply unequal definite proportions of the liquids in said last mentioned tanks to the first mentioned tank.

11. The combination, with an engine fuel supply pipe and a tank communicating therewith, of a pair of storage tanks for dissimilar liquids, and suction means for supplying the respective liquids from the last mentioned tanks in definite unequal invariable proportions to the first mentioned tank.

12. In a system of the character described, the combination, with an engine fuel supply pipe and a tank connected thereto, of a pair of auxiliary storage tanks, means for supplying liquid from each of the last mentioned tanks in definite unequal proportions to the first mentioned tank, and means, independent of such supplying means, for maintaining such proportions invariable.

13. The combination, with an engine fuel supply pipe and a tank connected thereto, of a pair of auxiliary storage tanks, means for supplying liquid from each of said tanks in definite proportions to the first mentioned tank, and means for rendering the supplying means inoperative when the liquid in either of the tanks falls below a predetermined level.

14. The combination, with an engine fuel supply pipe and a tank connected thereto, of a pair of storage tanks each having an outlet, means communicating with each outlet for forcing the liquid supplied from said tanks in definite proportions to the first mentioned tank, and means operating to automatically cut off the supply through either of said tank outlets to its supply connection should the liquid in the other tank fall to or below the predetermined point.

In testimony whereof, I hereunto affix my signature.

THOMAS J. FAY.